(Model.)
G. H. JOHNSON.
HARROW.
No. 244,248. Patented July 12, 1881.
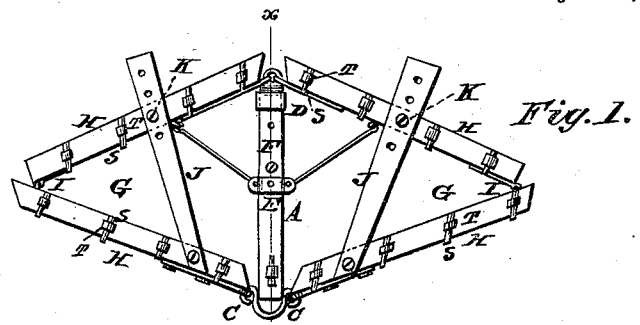
Fig. 1.
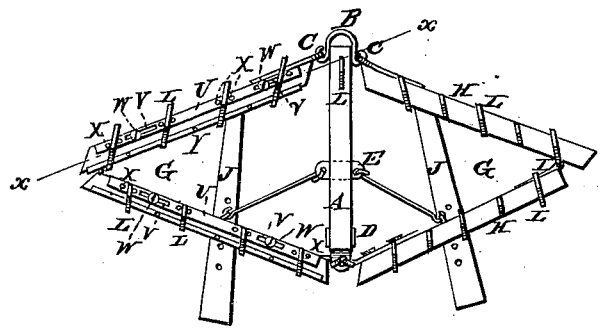
Fig. 2.
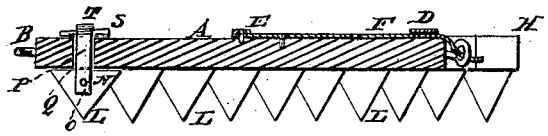
Fig. 3.
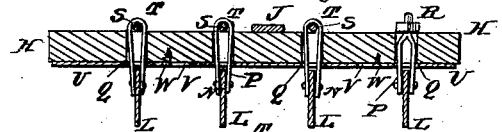
Fig. 4.
Fig. 5.
WITNESSES
Fred. G. Dieterich
D. C. Dieterich
INVENTOR
George Harvey Johnson
By his Attorneys
A. Snow & Co.
N. PETERS, Photo-Lithographer, Washington, D. C.

UNITED STATES PATENT OFFICE.

GEORGE H. JOHNSON, OF SALTPETRE CAVE, VIRGINIA.

HARROW.

SPECIFICATION forming part of Letters Patent No. 244,248, dated July 12, 1881.

Application filed May 14, 1881. (Model.)

*To all whom it may concern:*

Be it known that I, GEORGE H. JOHNSON, of Saltpetre Cave, in the county of Botetourt and State of Virginia, have invented certain new and useful Improvements in Harrows; and I do hereby declare that the following is a full, clear, and exact description of the invention, which will enable others skilled in the art to which it appertains to make and use the same, reference being had to the accompanying drawings, which form a part of this specification.

Figure 1 is a top view of my improved harrow. Fig. 2 is a bottom-plan view of the same. Fig. 3 is a vertical longitudinal cross-section on the line $x\ x$, Fig. 1. Fig. 4 is a vertical sectional view on the line $y\ y$, Fig. 2; and Fig. 5 is a detail view of one of the teeth.

Corresponding parts in the several figures are denoted by like letters of reference.

This invention relates to harrows or clod-breakers; and it consists in certain improvements in the construction of the frame and the mechanism for adjusting the teeth, as will be hereinafter more fully described, and particularly pointed out in the claims.

In the drawings hereto annexed, A represents the central longitudinal harrow-beam, which is provided at the front end with a clevis, B, upon the sides of which eyes C C are formed, as shown. The beam A is provided at its rear end with bails or brackets D E, forming bearings for a longitudinally-sliding strap, F, adjustable to any desired position, where it may be retained by a set-screw, G.

The harrow is composed of two sides or sections, G G, each constructed of two beams, H, hinged together, as shown at I, and having their other ends hinged respectively to the eyes C of clevis B and to the rear end of the sliding strap F, as shown. It will be seen that by adjusting the said sliding strap the harrow-sections may be contracted or expanded at will, thus causing the harrowing to be done fine or coarse, as may be desired.

Cross pieces or braces J are pivoted upon the front bars and adjustable by set-screws K upon the rear bars or beams of the harrow-sections, in order to assist in retaining the latter in the position to which they may be adjusted.

L L represent the harrow-teeth, which consist of regular triangular thin flat pieces of cast, wrought, or rolled metal, having central perforations, M, to receive the pins N, by which the said teeth are pivoted in the lower forked ends or sockets, O, of the shanks or tangs P, which latter are secured in the vertical perforations, Q, in the harrow-beams by means of nuts R, adjustable upon their upper threaded ends, or, if preferred, by means of wedges S, which may be driven through eyes T formed in the upper ends of said shanks, or in any other suitable manner.

It will be seen that by tightening the nuts or wedges the upper edges of the harrow-teeth are forced up against the under sides of the beams, thus preventing the teeth from turning upon their pivots.

To adjust the planes of the teeth longitudinally I avail myself of a rod or bar, U, provided with longitudinal slots V, by which it is adjustable upon studs or set-screws W upon the under side of the harrow-beams. The plate or plates V are provided at suitable intervals with studs X, fitting upon the sides of the harrow-teeth, as shown.

The edges of the harrow-beams opposite the sliding plates V are provided with metallic bearing-plates Y.

It will be seen that by adjusting the plates V the several teeth of the machine may be adjusted to any desired angle in relation to the vertical longitudinal plane of the device.

From the foregoing description, taken in connection with the drawings hereto annexed, the operation and advantages of my invention will be readily understood. The teeth are so supported and strengthened by the tangs or shanks in which they are adjusted that they may be made quite thin, and thus not very expensive. Each tooth has three separate points, which may be consecutively exposed for use. The arrangement of the teeth in the frame enables them to be adjusted so as to present a sharp or slanting front, so that they will cut the soil like the teeth of a saw, instead of simply pushing and displacing the clods; and the frame being jointed, as shown, will adapt itself to any unevenness of the ground.

Having thus described my invention, I claim and desire to secure by Letters Patent of the United States—

1. The combination, with the herein-described harrow-tooth, consisting of a flat, regular triangular plate, of a forked vertically-adjustable tang, shank, or holder, as herein described, for the purpose set forth.

2. The combination, with the harrow-beams having vertical openings, of the forked shanks or holders having pivoted regular triangular plates or teeth, and means for so adjusting the said shanks as to force the upper edges of said teeth against the under sides of the harrow-beams, as herein described, for the purpose set forth.

3. The combination of the harrow-beams, vertical shanks or holders P, having triangular teeth L, and the slotted longitudinally-adjustable plates U, having studs X, as herein described, for the purpose set forth.

4. The combination, with the vertical shanks or holders having triangular teeth L, of the longitudinally-adjustable slotted plates U, having studs X, and the bearing-plates Y, secured upon the under side of the harrow-beams, as herein described, for the purpose set forth.

In testimony that I claim the foregoing as my own I have hereto affixed my signature in presence of two witnesses.

GEORGE H. JOHNSON.

Witnesses:
    JNO. Q. A. KELLY,
    KENTON B. STONER.